July 23, 1968
A. PSARRIS
3,393,670
FOLDABLE AND PORTABLE BRAZIER
Filed Dec. 22, 1966
5 Sheets-Sheet 3
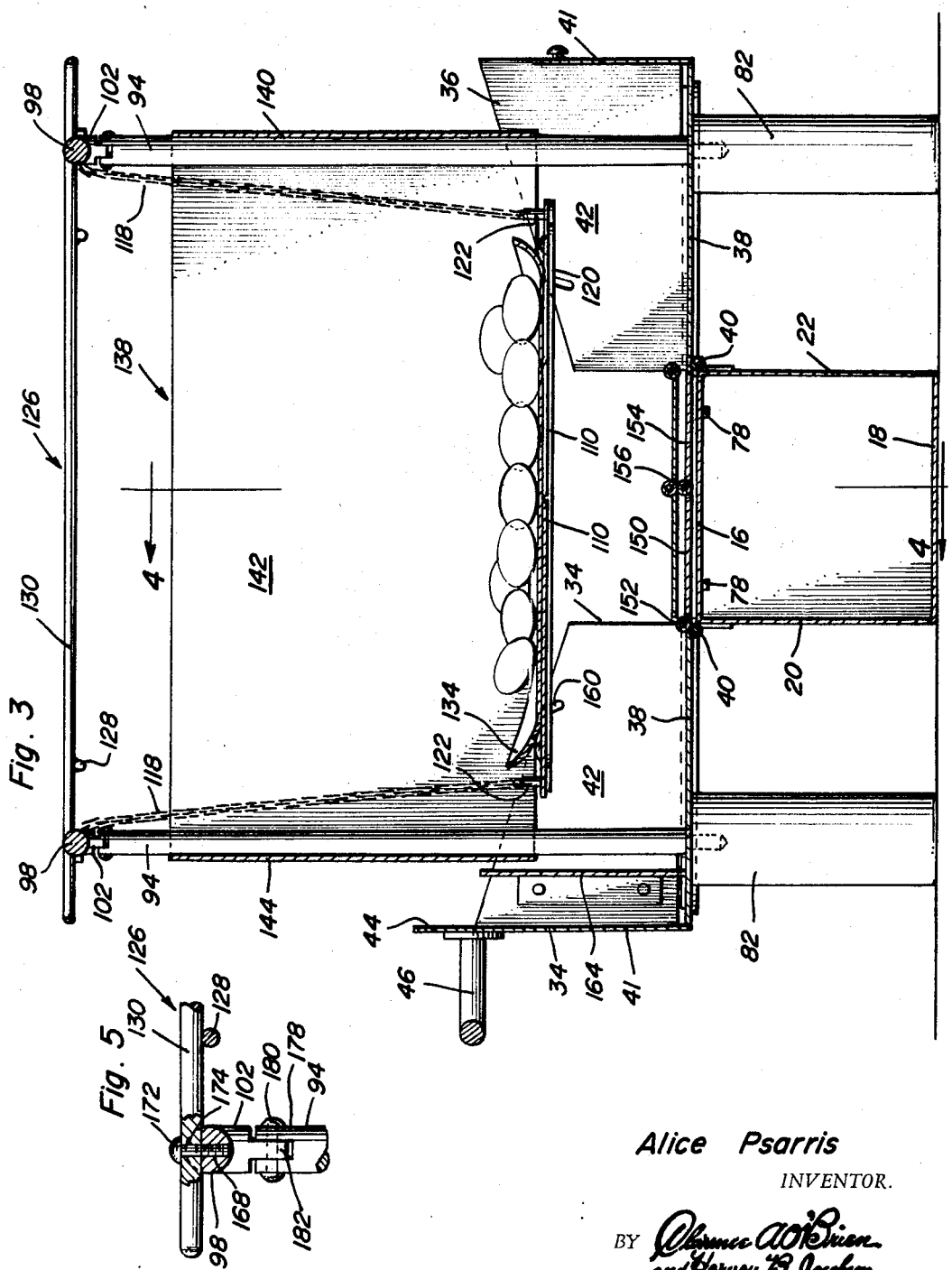
Alice Psarris
INVENTOR.

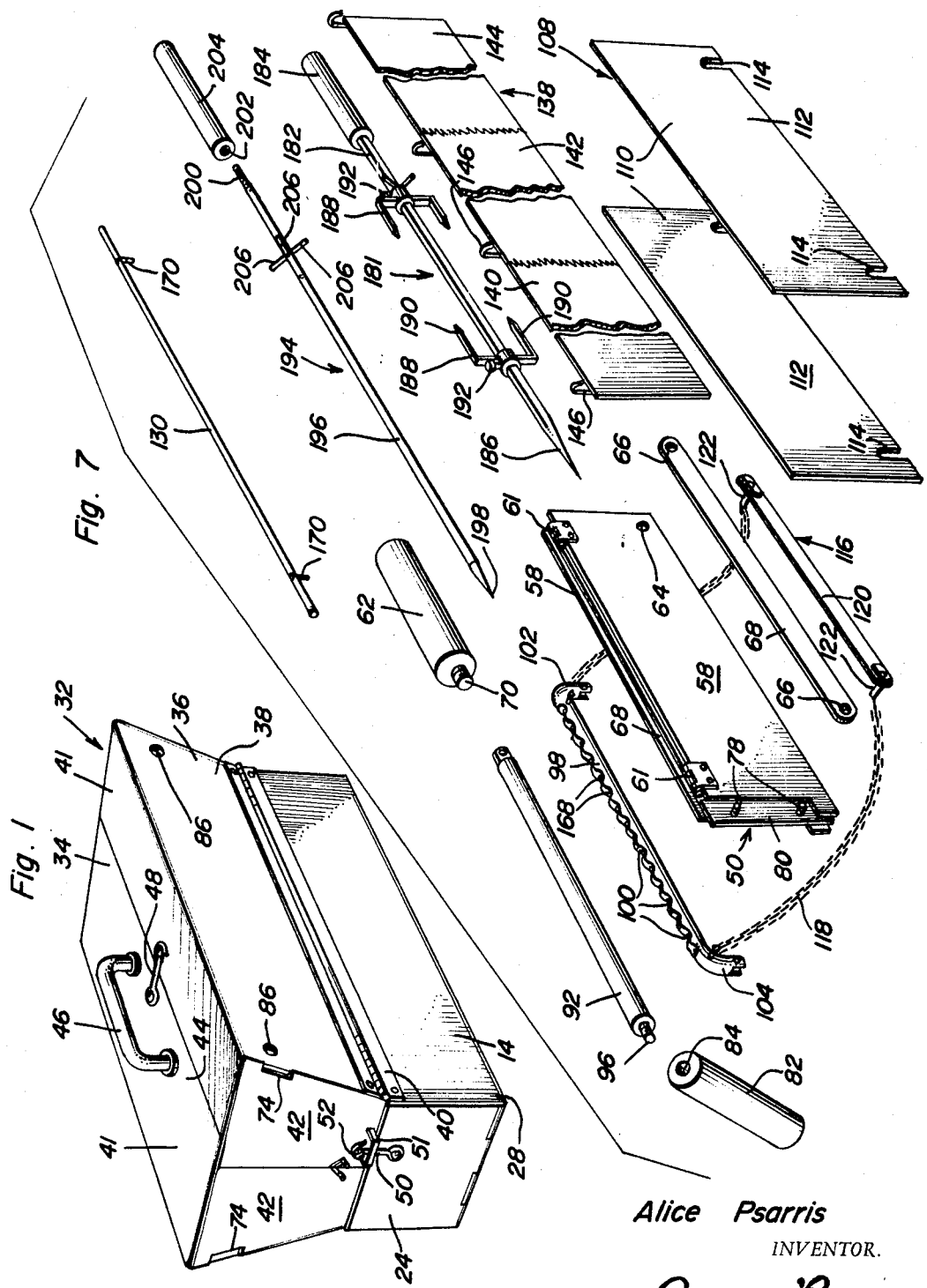

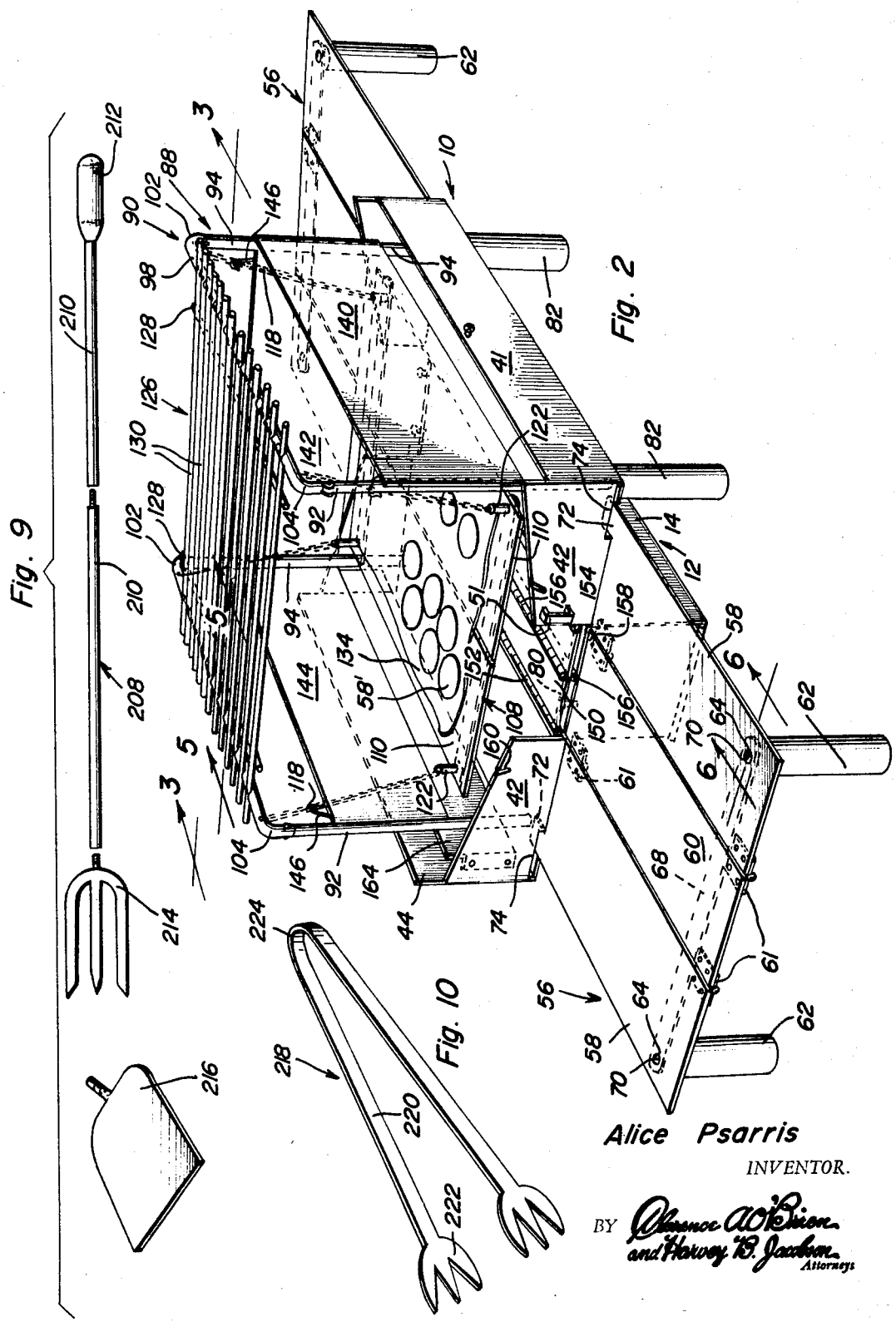

July 23, 1968  A. PSARRIS  3,393,670
FOLDABLE AND PORTABLE BRAZIER
Filed Dec. 22, 1966  5 Sheets-Sheet 4
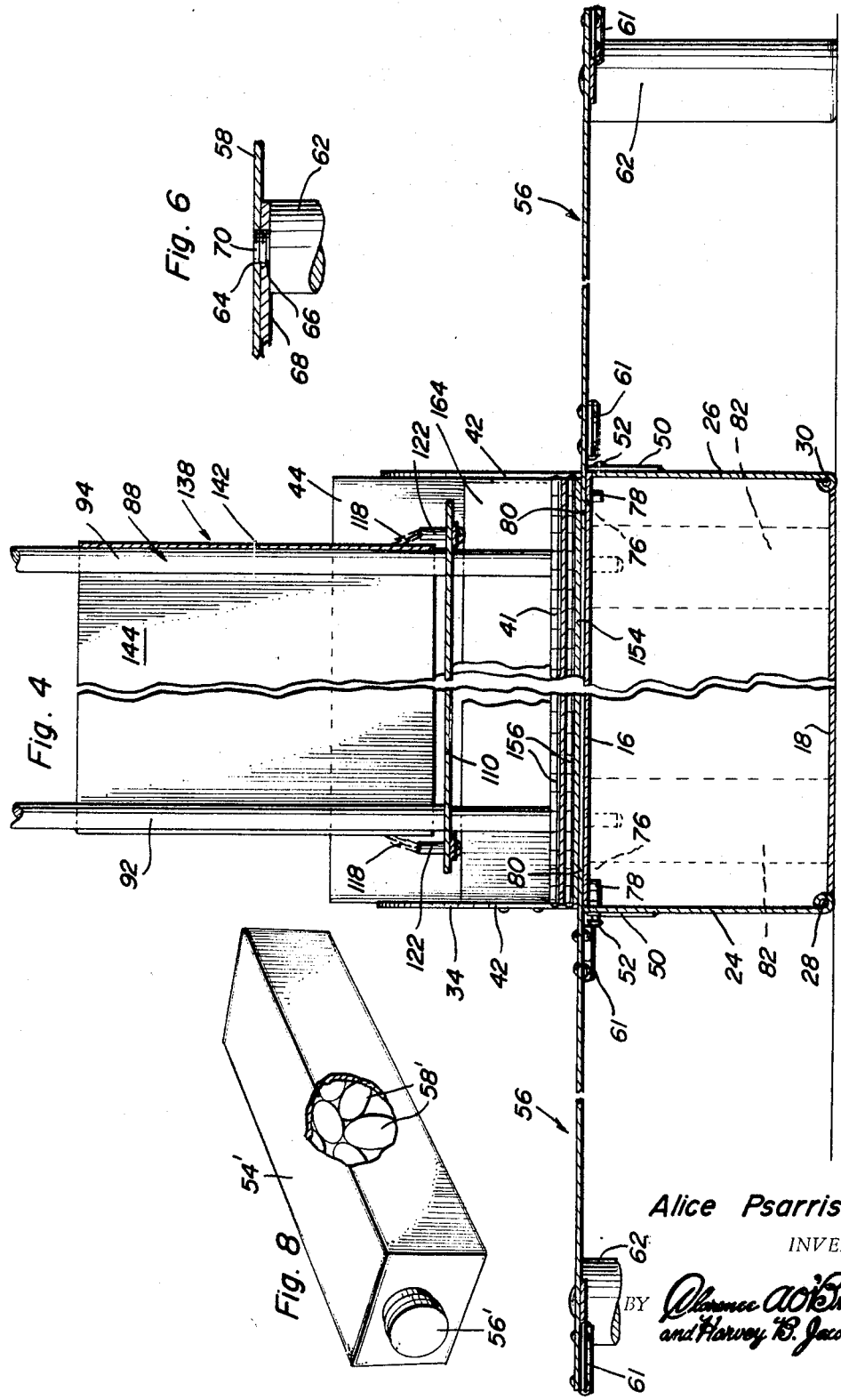
Alice Psarris
INVENTOR.

July 23, 1968  A. PSARRIS  3,393,670
FOLDABLE AND PORTABLE BRAZIER
Filed Dec. 22, 1966  5 Sheets-Sheet 5
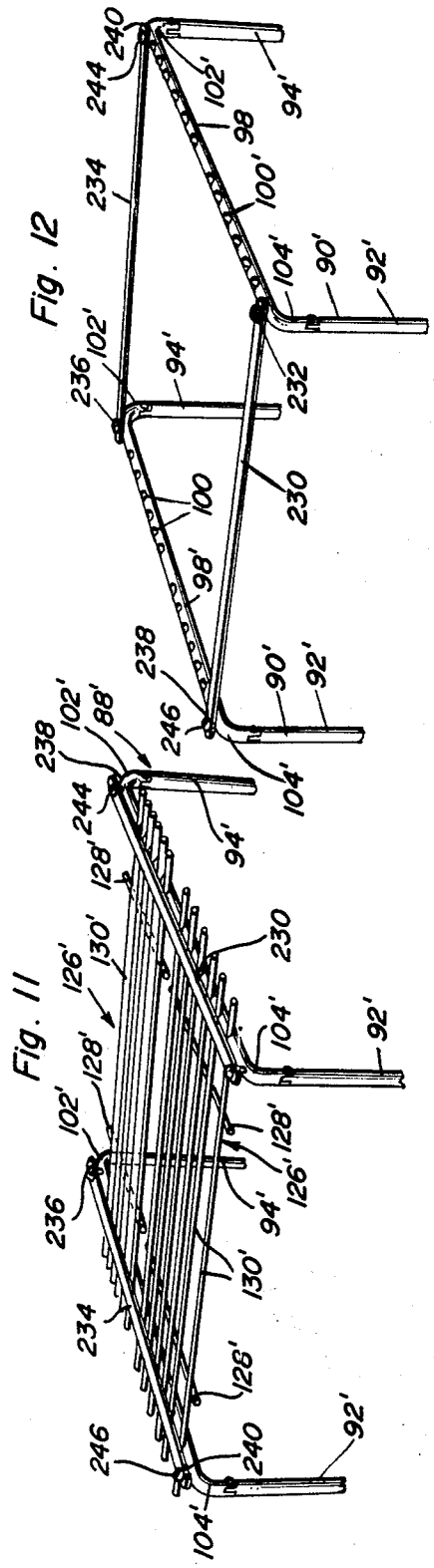
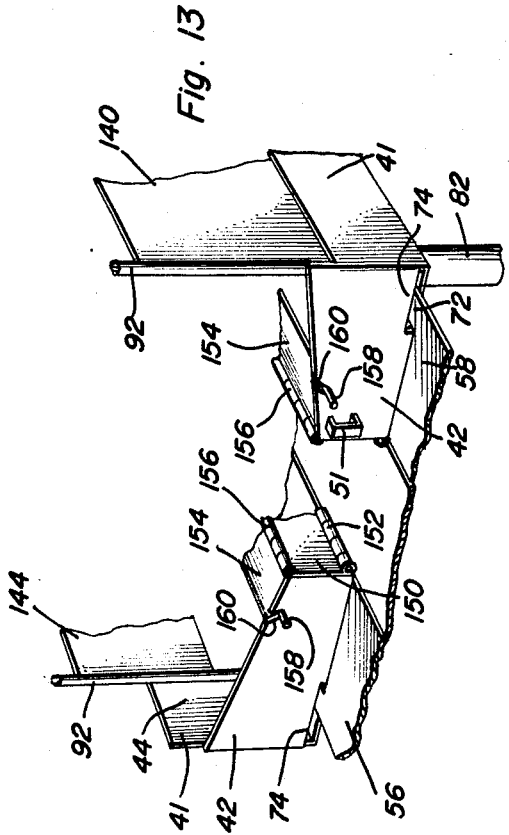
Alice Psarris
INVENTOR.

United States Patent Office
3,393,670
Patented July 23, 1968

3,393,670
FOLDABLE AND PORTABLE BRAZIER
Alice Psarris, 25 Groton St.,
Lowell, Mass. 01852
Filed Dec. 22, 1966, Ser. No. 604,043
14 Claims. (Cl. 126—25)

ABSTRACT OF THE DISCLOSURE

A brazier which may be collapsed into a generally rectangular and horizontally elongated box-like structure including a bail-type handle for ease in transporting and which, when erected, includes an elevated vertically adjustable fire pan over which a grill is supported, outwardly directed support shelves and upright walls enclosing and projecting above said fire pan on at least three sides thereof.

---

This invention relates to a novel and useful foldable and portable brazier and more specifically to a brazier which, when in the folded condition for transportation from one location to another, resembles a generally rectangular box-like structure provided with a bail-type handle on its top portion which may be readily grasped in one hand for the purpose of transporting the brazier in its collapsed condition from one location to another in a manner similar to that in which a piece of luggage is carrier.

The brazier of the instant invention includes several component assemblages including a foldable fire table adapted to be suspended beneath the cooking grill of the brazier and to support combustible material thereon, a foldable shield assembly which is adapted to be erected in wall fashion about the fire table when the latter is in use, a dismountable elevated grill assembly for disposition above the fire table, and a collapsible housing structure which may be opened and utilized to support the aforementioned components of the brazier in operative positions relative to each other and which includes removable depending leg portions for supporting the housing-like structure in an elevated position above a suitable supporting surface and also foldable serving table sections which may be erected and removably secured to the housing structure of the brazier when the latter is in use.

The housing structure of the brazier, when in the folded closed position includes internal portions and compartments thereof adapted to receive all of the aforementioned components of the brazier and further includes a compartment in which a container is removably disposed, which container is adapted to receive the combustible material adapted to be utilized in conjunction with the brazier.

The main object of this invention is to provide a foldable and portable brazier of the type hereinabove set forth which may be readily transported from one location to another and yet which may be extended and erected into an operative condition with a minimum amount of effort.

Another object of this invention is to provide a brazier in accordance with the immediately preceding object which may be readily constructed primarily of sheet material so as to be more economically produced.

A still further object of this invention is to provide a brazier of the collapsible type and which will provide a relatively large cooking area in relation to the total volume of the brazier when the latter is in its collapsed position.

A final object of this invention to be specifically enumerated herein is to provide a foldable and portable brazier in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the portable brazier of the instant invention illustrated in a collapsed position ready for transportation from one location to another;

FIGURE 2 is a perspective view of the brazier in an extended and operative condition;

FIGURE 3 is an enlarged fragmentary transverse vertical sectional view taken substantially upon the plane indicated by the section line 3—3 of FIGURE 2;

FIGURE 4 is a fragmentary longitudinal vertical sectional view taken substantially upon the plane indicated by the section line 4—4 of FIGURE 3;

FIGURE 5 is an enlarged fragmentary transverse vertical sectional view taken substantially upon the plane indicated by the section line 5—5 of FIGURE 2;

FIGURE 6 is an enlarged fragmentary transverse vertical sectional view taken substantially upon the plane indicated by the section line 6—6 of FIGURE 2;

FIGURE 7 is a perspective view of a group of selected components of the brazier shown in exploded relation;

FIGURE 8 is a perspective view of the container portion of the brazier which is adapted to have the combustible material disposed therein, portions of the container being broken away and illustrated in section;

FIGURE 9 is an exploded side elevational view of a variable length cooking utensil adapted to be utilized in connection with the brazier and with an alternate food-engaging end portion illustrated in perspective;

FIGURE 10 is a perspective view of another utensil adapted to be utilized in conjunction with the brazier of the instant invention;

FIGURE 11 is a fragmentary perspective view of a modified component of the brazier;

FIGURE 12 is a view similar to FIGURE 11 but with the grill of the brazier removed; and FIGURE 13 is a fragmentary perspective view of the left end of the brazier housing of FIGURE 2.

With reference now more specifically to the drawings, the numeral 10 generally designates the portable brazier of the instant invention.

The brazier 10 includes a housing generally referred to by the reference numeral 12 and which includes a generally rectangular lower portion 14 including top and bottom walls 16 and 18 interconnected by means of a pair of upstanding opposite side walls 20 and 22. The lower portion 14 also includes a pair of opposite end walls 24 and 26 hingedly secured to the corresponding ends of the bottom wall 18 as at 28 and 30, respectively, and swingable between the upright positions thereof illustrated in FIGURE 4 of the drawings and generally horizontally disposed positions with their free upper edge portions swung outwardly and downwardly away from the corresponding ends of the lower portion 14.

The housing 12 also includes an upper portion generally referred to by the reference numeral 32 and which comprises a pair of swingable top halves 34 and 36. Each of the top halves 34 and 36 includes a side panel 38 which is hingedly secured to the upper marginal edge portion of the corresponding side wall of the lower portion by means of a suitable piano hinge assembly 40. In addition, each top half includes a top panel 41 and a pair of opposite end panels 42 interconnecting the adjacent ends of each pair of side and top panels 38 and 41.

The top panel 41 of the top half 34 includes an extension 44 at its free edge portion which is adapted to overlie the free edge portion of the top panel 41 on the top half 36 when the top halves 34 and 36 are in the closed position illustrated in FIGURE 1 of the drawings. In addition, the top panel 41 of the top half 34 also includes a downwardly opening bail-type handle 46 and latch means 48 is carried by the top panel 41 of the top half 34 and engageable with the top panel 41 of the top half 36 to retain the top halves 34 and 36 in the closed positions. In addition, each of the end walls 24 and 26 includes latch means 50 disposed within a guard 51 engageable with an anchor 52 carried by one corresponding end panel 42 for releasably retaining the end walls or panels 24 and 26 in the closed positions illustrated in FIGURES 1 and 4.

In FIGURE 8 of the drawings, there may be seen a generally rectangular container 54' having a removable closure 56' on one end thereof. The container 54' is adapted to receive charcoal briquettes 58' or the like therein and to be removably positioned in the lower portion 14 of the housing 12. The container 54' may be inserted into the lower portion 14 by releasing one of the latch means 50 and swinging the corresponding end wall downwardly so as to open one end of the lower portion 14. Then, the container 54' may be inserted into the lower portion 14 and the open end wall may be returned to its closed position and latched in that closed position.

The brazier 10 includes a pair of substantially identical serving table assemblies each designated generally by the reference numeral 56. Each assembly 56 includes a pair of opposite side panels 58 and a center panel 60. The panels 58 are pivotally secured along adjacent edge portions to the opposite longitudinal edge portions of the panel 60 by means of hinge assemblies 61 thereby enabling the assemblies 56 to be folded from the fully extended positions thereof illustrated in FIGURE 2 of the drawings to the collapsed position illustrated in FIGURE 7 of the drawings. Each of the assemblies 56 includes a pair of depending support legs 62 and each of the panels 58 is provided with a threaded bore 64 and the bores 64 are registrable with a pair of smooth bores 66 of slightly larger diameter formed in the opposite ends of a support and bracing arm 68 provided for each assembly 56. Each of the support legs 62 includes a threaded shank portion 70 on its upper end which is receivable through the corresponding bore 66 and threadedly engageable in the corresponding bore 64. In addition, the remote edge portions of the panels 58 include extensions 72 on the ends thereof remote from the support legs 62 and which are receivable in slots 74 provided therefore in the corresponding end panels. Further, the top wall 16 includes a pair of bores 76 at each end thereof in which a pair of depending pins 78 carried by extensions 80 on the adjacent ends of the panels 60 are removably receivable. Accordingly, the positioning pins 78 prevent displacement of the assemblies 56 relative to the corresponding ends of the housing 12 and the extensions 72 serve to support the free remote edge portions of the panels 58 at the ends thereof adjacent the housing 12.

The top halves 34 and 36 each also include a pair of support legs referred to by the reference numerals 82 and each of the legs 82 includes a longitudinal blind threaded bore 84 which is registrable with a corresponding smooth and slightly larger diameter bore 86 formed in the corresponding side panel 38.

A grill and fire pan or table support assembly is generally referred to by the reference numeral 88 and includes a pair of substantially identical opposite side support members each designated generally by the reference numeral 90. Each of the support members includes a short upright 92 and a slightly longer upright 94. The lower ends of the uprights 92 and 94 each include a diametrically reduced threaded terminal end portion 96 which are passed through the corresponding bore 86 and threadedly engaged in the corresponding bore 84. In addition, each of the support members 90 includes a longitudinally extending support arm 98 which is notched at various points spaced longitudinally there along as at 100 and each support arm 98 includes a short downturned end portion 102 on one end and a slightly longer downturned end portion 104 on the other end. The upper end of each short upright 92 has its upper end pivotally supported from the corresponding longer downturned end portion and the upper end of each longer upright 94 is pivotally secured to the corresponding shorter downturned end portion 102. In this manner, when the support members 90 are removed, the upright 94 may first be folded to positions closely underlying the corresponding support arms 98 and then the shorter uprights 92 may be folded to positions closely underlying the corresponding longer upright 94 whereby the support members 90 may be stored in a compact state.

A fire pan assembly generally referred to by the reference numeral 108 is provided and includes a pair of panel-like half sections 110 which are substantially identical in configuration. The half sections 110 include remote longitudinal edge portions 112 provided with outwardly opening and transversely extending notches 114 at their opposite ends. The half sections 110 are supported from the support arms 98 by means of hanger assemblies generally referred to by the reference numerals 116. Each of the hanger assemblies 116 includes a pair of chain sections 118 secured at one pair of corresponding ends to the opposite ends of the corresponding support arm 98 and a rigid strap-like elongated brace 120 interconnects the other pair of corresponding ends of each pair of chain sections 118. The opposite ends of each brace 120 include a pair of upstanding shank portions 122 to whose upper ends of the adjacent ends of the corresponding chain sections 118 are secured and the shank portions 122 are receivable in the notches 114 in them anner illustrated in FIGURE 2 of the drawings with the half sections 110 resting upon the braces 120 and their side edge portions remote from the notches 114 disposed in edge-abutting relation.

A grill assembly generally referred to by the reference numeral 126 is provided and includes a pair of generally parallel longitudinal support rods 128 to which a plurality of transverse rods 130 are secured in any convenient manner such as by welding. The support rods 128 are disposed intermediate the opposite ends of the transverse rods 130 and the extended end portions of the transverse rods 130 which project beyond the support rods 128 are removably received in the upwardly opening notches 100 formed in the corresponding support arms 98.

If it is desired, the fire pan assembly 108 may have a shallow pan-like receptacle 134 constructed of sheet aluminum foil or the like disposed thereon and a quantity of the charcoal briquettes 58' from within the container 54' may be disposed in the shallow pan-like receptacle 134 and ignited for providing sufficient heat to cook food placed upon the grill assembly 126.

From FIGURE 2 of the drawings, it may be seen that the fire pan assembly 108 is suspended beneath the grill assembly 126 from the support members 90 by way of the chain sections 118 and that a shield assembly generally referred to by the reference numeral 138 is also suspended from the support members 90 by means of the chain sections 118.

The shield assembly includes three pivotally connected sections 140, 142 and 144 which are panel-like in configuration and include hooks 146 adapted for releasable engagement with the chain sections 118 at selected points spaced longitudinally there along. The shield assembly 138 of course prevents fat which may drip down from the meat being cooked on the grill assembly 126 from splattering outwardly to the sides of the brazier 10.

From FIGURE 3 of the drawings, it may be seen that the top halves 34 and 36 include bottom panels 150 which are pivotally secured to the lower edge portion of the side panels 38 by means of hinge assemblies 152 and inner side walls panels 154 which are pivotally secured to the free edges of the bottom panels 150 by means of hinges 156, the free edges of the panels 154 including endwise outwardly projecting pins 158 which are seatingly receivable in inclined notches 160 formed in the end panels 42 of the halves 34 and 36. The bottom and inner panels 150 and 154 form compartments within the top halves 34 and 36 when the latter are closed to receive various removable components of the brazier 10 when they are in their disassembled conditions. Further, the top half 34 includes a shelf-defining partition 164 which is secured between the end panels 42 thereof and may be utilized to receive several of the plate-like components of the brazier 10 such as the shield assembly 138 and the fire pan assembly 108 when these components are disassembled.

With attention now directed more specifically to FIGURE 7 of the drawings, it may be seen that the notched portions 100 of the support arms 98 also include upstanding bores 168 which are adapted to receive the depending pins 170 carried by the opposite ends of the transverse rods 130 of the grill assembly 126. In this manner, the grill assembly 126 may be retained in position on the support arms 98 of the support members 90.

If it is desired, the depending pins 170 may be in the form of threaded fasteners 172 passed through suitable bores 174 formed in the transverse members 130 and threadedly engaged in the bores 168 formed in the support arms 98. However, if the threaded fasteners 172 are to be utilized, in order to lessen the task of securing the grill assembly 126 to the support members 90 only one or two fasteners 172 will be used in conjunction with each support member 90.

With attention now invited to FIGURE 5 of the drawings, it may be seen that the upper ends of the various uprights 92 and 94 are bifurcated as at 178 and that pivot fasteners 180 are passed through the uprights and also depending apertured lug portions 182 carried by the end portions 102 and 104.

The brazier 10 includes four cooking utensils the first of which is generally designated by the reference numeral 181 and is illustrated in FIGURE 7 of the drawings. The utensil 181 includes a noncircular shank portion 182 having a handle 184 on one end and a point 186 at the other end. A pair of food engaging slide members 188 are slidably mounted on the shank 182 and include food impaling members 190 and setscrews 192 for securing the members 188 in adjusted positions along the shank portion 182.

A second utensil is also illustrated in FIGURE 7 of the drawings and is generally designated by the reference numeral 194. The utensil 194 includes a shank portion 196 pointed as at 198 on one end and including a diametrically reduced threaded extension 200 on the other end which is threadedly receivable in a blind bore 202 formed in a handle portion 204 for the utensil 194. The utensil 194 includes a plurality of pins 206 which project generally radially outwardly of four sides of the shank portion 196 and thereby adapted tthe shank portion 196 to be stationarily positioned on a supporting surface against rotation about its longitudinal axis.

A third utensil is generally designated by the reference numeral 208 and is illustrated in FIGURE 9 of the drawings. The utensil 208 includes a plurality of shank portions 210 which may be threadedly secured together in any number so as to form a utensil of any given length and one end of the utensil 208 has a handle 212 threadedly secured thereon in lieu of still another shank portion section 210 while the remote end of the utensil 208 has a forked end portion 214 threadedly engaged thereon in lieu of a further shank portion 210. In addition, a spatula-type of end portion 216 may be utilized in lieu of the end portion 14 and threadedly engaged with the end of the shank portion 210 remote from the handle portion 212.

A fourth utensil generally designated by the reference numeral 218 is illustrated in FIGURE 10 of the drawings and comprises a tong assembly including a pair of arms 220 which are forked at one pair of corresponding ends as at 222 and joined together by means of an integral spring portion 224 at the other pair of corresponding ends. The utensils 181, 194, 208 and 218 are all constructed in a manner so that they may be enclosed within the brazier 10 when the latter is in its collapsed and closed position illustrated in FIGURE 1 of the drawings.

With attention now invited more specifically to FIGURES 11 and 12 of the drawings there may be seen a modified form of grill and fire pan or table support assembly generally referred to by the reference numeral 88' and which includes many structural features that are identical to corresponding structural features of the assembly 88 and which are therefore designated by prime numerals corresponding to the numerals designating the corresponding components of the assembly 88.

Further, a pair of grill assemblies generally referred to by the reference numerals 126' is also provided for support from the assembly 88' and each includes a pair of generally parallel longitudinal support rods 128' interconnecting and bracing corresponding opposite end portions of a plurality of transverse rods 130'. The opposite ends of the rods 130' are cradled in the notches 100' formed in the support arms 98' of the assembly 88'. In addition, one end of one of the support arms 98 has a bracing bar 230 pivotally secured thereto as at 232 while the opposite end of the other support arm 98' has one end of a corresponding bar 234 pivotally secured thereto as at 236.

As can best be seen from FIGURE 11 of the drawings each grill assembly 126' may be secured in position by swinging the free ends of the bars 230 and 234 over the opposite end portions of the transverse rods 130'. The free ends of the bars 230 and 234 are notched as at 238 and 240, respectively, and may be engaged under the head portions 244 and 246 of a pair of threaded fasteners secured in threaded bores (not shown) formed in corresponding ends of the arms 98' and corresponding to the threaded bores 168. With the bars 230 and 234 positioned as illustrated in FIGURE 11 of the drawings beneath the heads 244 and 246, respectively, each grill assembly 126' is secured in its operative position. However, if it is desired not to use the grill assemblies 126' the bars or arms 230 and 234 may be swung to the positions thereof illustrated in FIGURE 12 of the drawings with their free end portions secured beneath the head portions 246 and 244, respectively. In these positions the bars 230 and 234 will of course form suitable rigid bracing between the opposite side support members 90'. Further, either one or both of the grill assemblies 126' may be used at one time or they may both be removed as desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A foldable and portable brazier comprising a housing including a pair of opposing and upstanding opposite side panels pivotally supported from a lower portion of said housing adjacent their lower edges for pivotal movement about spaced apart and generally parallel axes toward and away from each other between first upstanding positions with the free edges of said panels swung toward each other and second positions with said free edges swung away from each other and said panels generally horizontally disposed, the free edge portion of at least one of said panels including a laterally directed top wall portion closing the top of said housing when said side panels are in their first positions, removable leg means supported from the free edge portions of said panels and projecting outwardly therefrom, said lower portion of said housing including a lower extremity spaced below said axes and adapted to rest upon a supporting surface therefor, said leg means projecting outwardly of said panels a distance adapted to span the distance between the adjacent portions of said panels and said supporting surface when said panels are in said second positions, and first and second means carried by said housing defining a fire pan disposed above said side panels and adapted to support a food cooking grill above said pan, respectively, when said panels are in said second positions.

2. The combination of claim 1 wherein said first means comprises support means suspended above said panels and adapted to have a fire pan positioned thereon.

3. The combination of claim 1 wherein said second means includes means removably supported from the inner surfaces of said panels and defining a pair of generally parallel horizontal support arms spaced above said panels and adapted to have a food cooking grill supported therefrom with said grill extending between said support arms.

4. The combination of claim 3 wherein said first means comprises support means suspended above said panels and adapted to have a fire pan positioned thereon, said support means being suspended from said support arms by means of flexible tension members.

5. The combination of claim 4 wherein said support means comprises a pair of elongated bars supported at each end by one of said tension members and extending transversely of said support arms.

6. The combination of claim 5 including a fire pan comprising a plurality of panel-like sections disposed in edge-to-edge side-by-side relation and removably positioned on said bars.

7. The combination of claim 1 wherein said opposite side panels include opposite end laterally directed end panels closing the opposite ends of the portion of said housing defined between said side panels when the latter are in said first positions.

8. The combination of claim 7 including at least one generally horizontal serving table assembly for one end of said housing, said serving table including one center elongated panel and a pair of opposite side elongated panels pivotally secured along adjacent longitudinal edge portions to the opposite side longitudinal edge portions of said center panel, one pair of corresponding ends of said table side panels including extensions and the other pair of corresponding ends of said table side panels including depending leg means and a removable brace extending transversely beneath said table panels, said end panels at said one end of said housing including slots therein adjacent and generally paralleling said housing side panels and adjacent the free edges of the latter, said extensions being removably positioned in said slots.

9. The combination of claim 8 wherein the corresponding end of said center panel also includes an extension, said lower portion of said housing including an upwardly facing surface over and upon which the last-mentioned extension extends and rests.

10. The combination of claim 9 wherein the last-mentioned extension includes depending locating pin means, said upwardly facing surface having an opening formed therein into which said locating pin projects.

11. The combination of claim 1 including a shelf supported from at least one of said side wall panels underlying the corresponding top wall portion when said one side wall panel is in its first position.

12. The combination of claim 1 wherein one of said side wall panels has one edge portion of a partial bottom wall panel secured thereto along its lower edge portion, a partial inner wall panel having one edge portion pivotally secured to the edge portion of said partial bottom wall panel remote from said one edge portion thereof and including means on its free edge portion removably engageable with portions of said one side wall panel retaining said partial inner wall panel in an upright position when said one side wall panel is in said first position.

13. A foldable and portable brazier comprising a housing including a pair of opposing and upstanding opposite side panels pivotally supported from a lower portion of said housing adjacent their lower edges for pivotal movement about spaced apart and generally parallel axes toward and away from each other between first upstanding positions with the free edges of said panels swung toward each other and second positions with said free edges swung away from each other and said panels generally horizontally disposed, removable leg means supported from the free edge portions of said panels and projecting outwardly therefrom, said lower portion of said housing including a lower extremity spaced below said axes and adapted to rest upon a supporting surface therefor, said leg means projecting outwardly of said panels a distance adapted to span the distance between the adjacent portions of said panels and said supporting surface when said panels are in said second positions, and a pair of inverted generally U-shaped support members removably supportable in upstanding position from and extending along the free edge portions of said panels when the latter are in said second positions thereof, generally panel-like fire pan means removably suspended from upper portions of said support members and extending between the latter at an elevation spaced above said panels, and a generally horizontal grill structure disposed above said fire pan means and removably supported from the upper end portions of said support members.

14. A foldable and portable brazier comprising a housing including a pair of opposing and upstanding opposite side panels pivotally supported from a lower portion of said housing adjacent their lower edges for pivotal movement about spaced apart and generally parallel axes toward and away from each other between first upstanding positions with the free edges of said panels swung toward each other and second positions with said free edges swung away from each other and said panels generally horizontally disposed, removable leg means supported from the free edge portions of said panels and projecting outwardly therefrom, said lower portion of said housing including a lower extremity spaced below said axes and adapted to rest upon a supporting surface therefor, said leg means projecting outwardly of said panels a distance adapted to span the distance between the adjacent portions of said panels and said supporting surface when said panels are in said second positions, means adapted to support a fire pan in elevated position above said lower portion, means adapted to support a food cooking grill above the elevation of said fire pan, the last-mentioned means comprising a pair of elongated generally parallel support members extending along opposite sides of said housing in elevated position relative thereto and adapted to have a grill structure bridging said support members supported therefrom, said support members including elongated locking and bracing rods pivotally secured at one set of ends to opposite ends of said support members for movement between first positions spaced above and extending along said support members adapted to overlie opposite marginal edge portions of said grill structure and second positions releasably secured at their free ends to the corresponding end of the other support member so as to alternately define bracing members extending between corresponding ends of said support member.

References Cited

UNITED STATES PATENTS

| | | | |
|---|---|---|---|
| 2,477,529 | 7/1949 | Sprinkle et al. | 126—9 |
| 2,728,335 | 12/1955 | Garrett et al. | 126—38 |
| 2,893,373 | 7/1959 | Rundle | 126—9 |
| 3,105,483 | 10/1963 | Bryan | 126—9 |
| 3,199,503 | 8/1965 | Hanson | 126—25 |

FREDERICK L. MATTESON, JR., *Primary Examiner.*

E. G. FAVORS, *Assistant Examiner.*